(No Model.)

W. H. SUTTON.
COMBINED KNIFE AND BURGLAR ALARM.

No. 425,010. Patented Apr. 8, 1890.

Witnesses
Henry G. Dieterich
H. F. Riley

Inventor
William H. Sutton,
By his Attorneys,
C. A. Snow & Co.

UNITED STATES PATENT OFFICE.

WILLIAM HARRISON SUTTON, OF FORDYCE, ARKANSAS, ASSIGNOR OF ONE HALF TO J. D. DUNN, OF SAME PLACE.

COMBINED KNIFE AND BURGLAR-ALARM.

SPECIFICATION forming part of Letters Patent No. 425,010, dated April 8, 1890.

Application filed June 4, 1889. Serial No. 313,092. (No model.)

*To all whom it may concern:*

Be it known that I, WILLIAM HARRISON SUTTON, a citizen of the United States, residing at Fordyce, in the county of Dallas and State of Arkansas, have invented a new and useful Burglar-Alarm, of which the following is a specification.

The invention relates to improvements in burglar-alarms.

The object of the present invention is to provide a combined burglar-alarm and knife of simple and inexpensive construction, designed to be secured to a door-casing and to explode a cartridge at the opening of the door.

The invention consists in the construction and novel combination and arrangement of parts, hereinafter fully described, illustrated in the accompanying drawings, and pointed out in the claim hereto appended.

Figure 1:
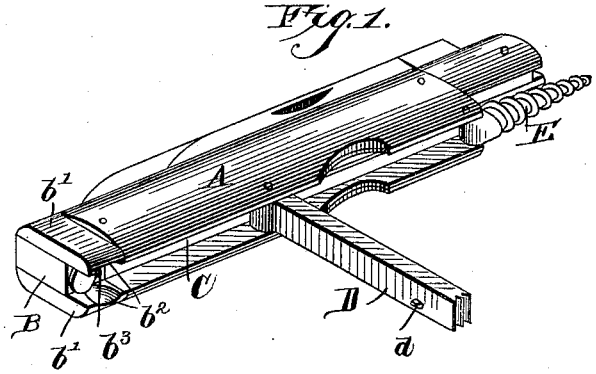
Figure 2:
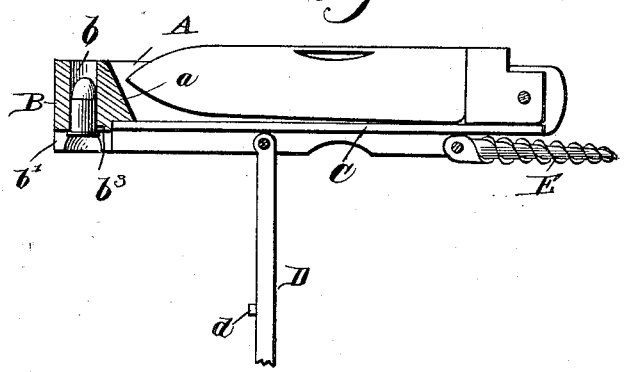
Figure 3:
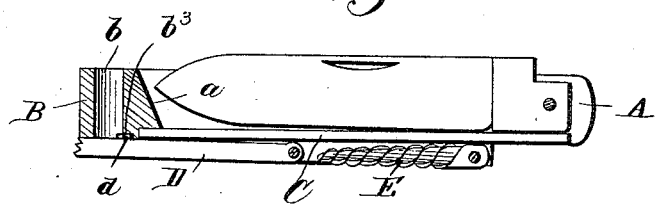

In the drawings, Figure 1 is a perspective view of a combined knife and burglar-alarm constructed in accordance with this invention, the parts being shown in position ready to be fastened to the casing of a door. Fig. 2 is a longitudinal sectional view, the parts being in the position shown in Fig. 1; and Fig. 3 is a similar view, the parts being folded into the handle of the knife.

Referring to the accompanying drawings, A designates the handle of a knife, provided with a metal block B, secured to its lower end and having its sides $a$ extended at the back beyond the spring C, to provide a casing to receive a striking-lever D, and a screw E to secure the knife to the casing of a door. The block $b$ is provided with a central bore $b$, which runs transversely across the knife and is adapted to receive a cartridge. Along the sides of the block B are secured plates $b'$, which may be formed integral therewith, and which extend beyond the back of the block and align with the sides $a$ of the knife and are provided with curved recesses $b^2$, which permit a cartridge to be easily slipped down upon the block B.

The striking-lever D is pivoted between the sides of the knife intermediate of the ends thereof, and is provided with a projection $d$ to engage the rim of a cartridge and explode the latter. The block has a small recess $b^3$, which receives the projection $d$ when the lever D is folded within the sides of the knife.

Between the upper ends of the sides A is provided a screw, gimlet, or similar tool E, which when open projects beyond the handle A of the knife and is designed to be inserted in the door-casing in order that the door when opened may move the lever D sufficiently to cause the spring to act and force the lever down upon a cartridge and explode the latter.

From the foregoing description and the accompanying drawings the construction, operation, and advantages of the invention will readily be understood.

What I claim is—

In a burglar-alarm, the combination of a knife having its sides extending rearwardly beyond the spring and being provided with a transverse bore at one end to receive a cartridge, the screw pivoted near one end of the knife, and the striking-lever pivoted intermediate the ends of the knife, said lever and screw when folded aligning and lying within the sides of the knife and being acted upon by the same spring that bears against the knife-blade, as set forth.

In testimony that I claim the foregoing as my own I have hereto affixed my signature in presence of two witnesses.

WILLIAM HARRISON SUTTON.

Witnesses:
R. M. NUTT,
H. A. BARNES.